(12) United States Patent
Goettle et al.

(10) Patent No.: US 10,999,980 B2
(45) Date of Patent: May 11, 2021

(54) DUAL-LAYER LED GROW-LIGHT SYSTEM

(71) Applicant: DemeGrow, Inc., Sacramento, CA (US)

(72) Inventors: Blane J. Goettle, Golden River, CA (US); Jesse James Graham, Roseville, CA (US); Michael Darren Musgrove, Dixon, CA (US)

(73) Assignee: DemeGrow, Inc., Sacramento, CA (US)

( * ) Notice: Subject to any disclaimer, the term of this patent is extended or adjusted under 35 U.S.C. 154(b) by 0 days.

(21) Appl. No.: 16/501,984

(22) Filed: Jul. 15, 2019

(65) Prior Publication Data

US 2019/0357452 A1 Nov. 28, 2019

Related U.S. Application Data

(63) Continuation-in-part of application No. 16/501,389, filed on Apr. 3, 2019, now abandoned.

(60) Provisional application No. 62/761,710, filed on Apr. 3, 2018, provisional application No. 62/764,091, filed on Jul. 18, 2018.

(51) Int. Cl.
| | |
|---|---|
| *F21S 4/28* | (2016.01) |
| *A01G 9/24* | (2006.01) |
| *F21V 23/04* | (2006.01) |
| *F21V 21/15* | (2006.01) |
| *F21Y 115/10* | (2016.01) |
| *F21Y 103/10* | (2016.01) |

(52) U.S. Cl.
CPC ............ *A01G 9/249* (2019.05); *F21S 4/28* (2016.01); *F21V 21/15* (2013.01); *F21V 23/045* (2013.01); *F21Y 2103/10* (2016.08); *F21Y 2115/10* (2016.08)

(58) Field of Classification Search
CPC .......... A01G 9/249; A01G 7/04; A01G 7/045; F21V 21/15; F21V 23/045; F21S 4/28; F21Y 2103/10; F21Y 2115/10
See application file for complete search history.

(56) References Cited

U.S. PATENT DOCUMENTS

| | | | |
|---|---|---|---|
| 2015/0319933 A1* | 11/2015 | Li ....................... | F21V 23/0442 47/58.1 LS |
| 2016/0007544 A1* | 1/2016 | Takashima ............... | A01G 7/06 47/1.01 R |
| 2016/0033098 A1* | 2/2016 | Bergman ................. | H02G 3/20 362/418 |
| 2016/0178179 A1* | 6/2016 | Hanson .................. | A01G 7/045 362/249.02 |
| 2019/0335675 A1* | 11/2019 | Ngo ....................... | A01G 7/045 |

* cited by examiner

*Primary Examiner* — Donald L Raleigh
(74) *Attorney, Agent, or Firm* — James A. Gavney, Jr.; JAG Patent Services

(57) ABSTRACT

A LED grow-light system is disclosed. The LED grow-light system includes dual-layer grow-light canopies with linear LED light bars to provide upward and downward lighting in a central illumination area. The LED light bars are preferably configured to move up and down relative to a grow bed through stepper motors attached to the grow-light canopies and vertical pole structures for supporting the grow-light canopies over the grow bed. The LED light bars include modulated LEDs, or LED arrays, to provide uniform light distribution over the grow bed while maintaining grow-light canopy footprints that are similar in size to the grow bed.

17 Claims, 14 Drawing Sheets

DUAL-LAYER LED GROW-LIGHT SYSTEM

RELATED APPLICATION

This U.S. patent application is a continuation-in-part of co-pending U.S. patent application Ser. No. 16/501,389, filed on Apr. 3, 2019, and titled "LED GROW-LIGHT SYSTEM" which claims priority under 35 U.S.C. § 119(e) from the U.S. provisional patent application Ser. No. 62/761,710, filed on Apr. 3, 2018, and titled "LED-GROW LIGHT SYSTEM." This application also claims priority under 35 U.S.C. § 119(e) from the U.S. provisional patent application Ser. No. 62/764,091, filed on Jul. 18, 2018, and titled "DUAL-LAYER LED GROW-LIGHT SYSTEM."

U.S. patent application Ser. No. 16/501,389, filed on Apr. 3, 2019, and titled "LED GROW LIGHT SYSTEM", provisional patent application Ser. No. 62/761,710, filed on Apr. 3, 2018, and titled "LED-GROW LIGHT SYSTEM, and provisional patent application Ser. No. 62/764,091, filed on Jul. 18, 2018, and titled "DUAL-LAYER LED GROW LIGHT SYSTEM", are all hereby incorporated by reference.

FIELD OF THE INVENTION

The invention relates to LED lighting systems. More particularly, the present invention relates to dual-layer LED grow-light systems with uniform light distribution to a central illumination area.

BACKGROUND OF THE INVENTION

A grow-light or plant light, is an artificial light source, generally an electric light, designed to stimulate plant growth by emitting a light appropriate for photosynthesis. Grow-lights either attempt to provide a light spectrum similar to that of the sun, or to provide a spectrum that is more tailored to the needs of the plants being cultivated. Depending on the type of plant being cultivated, the stage of cultivation (e.g. the germination/vegetative phase or the flowering/fruiting phase), and the photo-period required by the plants, specific ranges of spectrum, luminous efficacy and color temperature are desirable for use with specific plants and time periods.

Grow-lights are used for horticulture, indoor gardening, plant propagation, and food production, including indoor hydroponics and aquatic plants. Although most grow-lights are used on an industrial level, they can also be used in households.

According to the inverse-square law, the intensity of light radiating from a point source (in this case a bulb) that reaches a surface is inversely proportional to the square of the surface's distance from the source (if an object is twice as far away, it receives only a quarter the light) which is a serious hurdle for indoor growers, and many techniques are employed to use light as efficiently as possible. Reflectors are thus often used in the lights to maximize light efficiency. Plants or lights are moved as close together as possible so that they receive equal lighting and that all light coming from the lights falls on the plants rather than on the surrounding area. Therefore High Intensity Discharge (HID) lights are often used.

Common types of HID grow-lights include fluorescent grow-lights, Metal Halide (MH) grow-lights, Ceramic Metal Halide (CMH) grow-lights, High Pressure Sodium (HPS) grow-light, and Combination MH and HPS ("Dual Arc") grow-lights. Because of the improved effectiveness, energy costs, and longevity, many grow-light systems now utilize LED technology.

LED grow-lights are composed of light-emitting diodes, usually in a casing with a heat sink and built-in fans. White LED grow-lights provide a full spectrum of light designed to mimic natural light, providing plants a balanced spectrum of red, blue and green. However, the spectrum used varies. White LED grow-light are designed to emit similar amounts of red and blue light with an added green light to appear white.

SUMMARY OF THE INVENTION

One shortcoming of currently available LED grow-light systems is a rapid die-off in light density, and/or light intensity, from the central portion of an LED light canopy towards the outer edges of the LED light canopy. One solution would be to make a LED grow-light canopy that is substantially larger that the grow bed being illuminated by the LED grow-light canopy. This solution however is not satisfactory because of the increased footprint and inefficient energy consumption of the grow-light system. Currently available LED grow-light systems, are also not well suited for providing vertical light canopies for vertical grow beds. Furthermore, the LED grow-light canopy generally needs to be manually raised or lowered to accommodate the growth of plants or change lighting intensity above the grow bed within a central illumination area.

The present invention is directed to a dual-layer LED grow-light system. The dual-layer LED grow-light system includes grow-light canopies that maintain a small footprint and provide uniform lighting above a grow bed to the central illumination area. The grow-light canopies include a number of LED light bars, that are preferably elongated linear LED light bars, arranged in parallel on the canopy support structure. Each of the LED light bars include LEDs, or arrays of LEDs, arranged along a light emitting surface. The light emitting surfaces of the linear LED light bars collectively illuminate a grow bed positioned relative to the grow-light canopies.

The LEDs utilized in the LED light bars of the present invention can include LEDs emitting light having any number of wavelengths/colors, or combinations of wavelengths/colors, suitable for the application at hand. The LEDs utilized in the linear LED light bars can be tunable to change light emitting profiles and can also be dimmed to change the intensity of light emitted from individual LED light bars or collectively from all of the LED light bars.

In accordance with the embodiments of the invention, the operation of the grow-light system and/or position of the grow-light canopy is controlled by a control module. The control module includes a computer with a micro-processor and memory. The computer is configured to run software stored on the memory and implement grow-light protocols or programs. The grow-light protocols or programs can be dynamically modified in response to environmental feedback from a number of sensors located on or near LED grow-light system. The control module can, for example, control the intensity or density of light emitted, the distribution light emitted, and/or the wavelength of light emitted from light emitting surfaces of the LED light bars, to comply with a grow-light protocol or program suitable for the vegetation being cultivated and also preferably control vertical positioning of the grow-light canopy, such as described below.

In accordance with a preferred embodiment of the invention, the grow-light canopy provides substantially uniform light density and/or light intensity over the a central illumination area of a grow bed by reducing the light density and/or light intensity die-off at outer edges of the light canopy. Light density refers to a summation of photons emitted of all wavelengths over an area, and light intensity refers to a number of photons emitted for a selected wavelength over the area; light density and light intensity can, in some cases, be used interchangeably. Luminous flux (in lumens) is a measure of the total amount of light output in all directions, while luminous intensity (in candelas) is a measure of beam brightness in a particular direction. This application is generally concerned with luminous intensity of light that reaches a grow bed positioned below a grow-light canopy. However, it is understood that for unfocused light, luminous flux and luminous intensity are generally proportional to each other.

To reduce die-off of light density and/or light intensity at outer edges of a grow-light canopy, the present invention utilizes LED light bars with spatially modulated LED configurations. For example, LEDs, or arrays of LEDs, are spaced or positioned along the light emitting surfaces such that distances between adjacent LEDs, or arrays of LEDs, are sequentially reduced, when moving from the center portion of the light emitting surface of a LED light bar to the two end portions of the light emitting surfaces of the LED light bar.

In further embodiments of the present invention, LED light bars with physically modulated LED configurations are utilized, wherein larger arrays of LEDs are positioned near end portions of the light emitting surfaces of LED light bars, and smaller arrays of LEDs are positioned near center portions of the light emitting surfaces of the LED light bars.

In yet further embodiments of the present invention, LED light bars are spatially modulated within the canopy, such that separations between adjacent LED light bars is greater near outer edges of the grow-light canopy than separations of the LED light bar near the center portions of the grow-light canopy.

In accordance with a preferred embodiment of the invention, linear LED light bars, or a portion thereof, are configured to move up and down relative to the grow bed. The linear LED light bars, and the portion that is configured to move up or down manually and/or automatically, respond to control commands from a controller module and/or feedback from the grow-light, sensors. The positions of the linear LED light bars relative to the grow bed can be controlled from a wireless control or a remote computer to execute grow-light protocols or programs. The positions of the linear LED light bars relative to the grow bed are preferably controlled through stepper motors attached to the LED grow-light canopy, which move up and down along vertical canopy support pole structures of the LED grow-light system.

DETAILED DESCRIPTION OF THE INVENTION

Figure 1A:
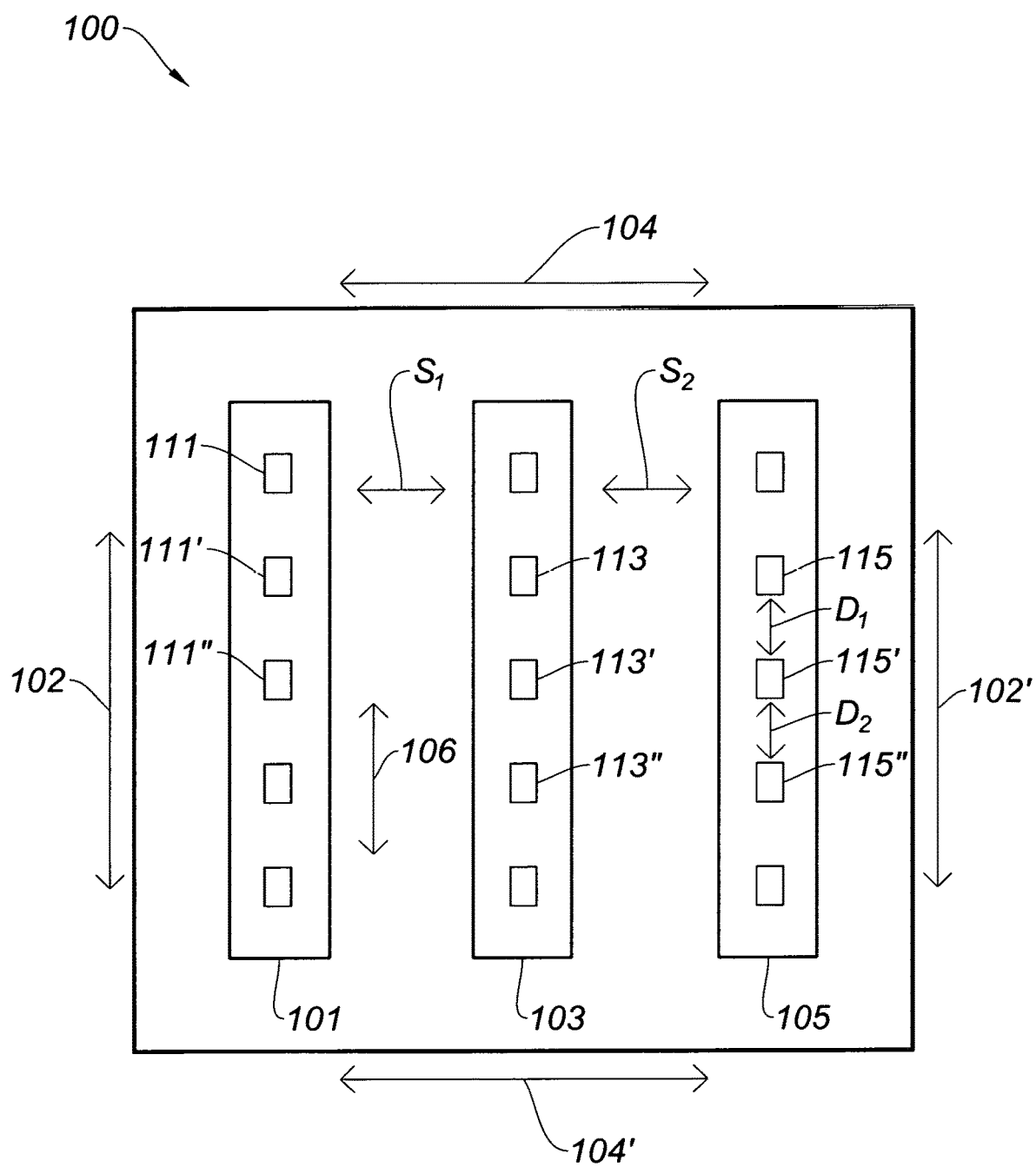
FIG. 1A shows a schematic representation of a grow-light canopy with linear LED light bars.

Referring to FIG. 1A, a LED grow-light system can include a LED grow-light canopy 100 with any number of LED light bars 101, 103 and 105. The LED light bars 101, 103 and 105 are preferably linear elongated LED light bars that are arranged to be parallel with respect to each other in a parallel or elongated direction, as indicated by the arrow 106.

Each of the LED light bars 101, 103 and 105 include LEDs or arrays of LEDs 111/111'/111", 113/113'/113", and 115/115'/115", respectively. The separation between adjacent and sequential LEDs or arrays of LEDs 111/111'/111", 113/113'/113", and 115/115'/115" is uniform, as indicated by the arrow $D_1$ and $D_2$. Also, the parallel separations of distances between adjacent LED light bars is also usually uniform, as indicated by the arrow $S_1$ and $S_2$. The light canopy 100 described and illustrated in FIG. 1A will exhibit die off in light density, and/or intensity, around the outside edges 102/102' and 104/104' of the LED grow-light canopy 100 and around edges of any grow bed of comparable size positioned below the LED grow-light canopy 100.

Figure 1B:
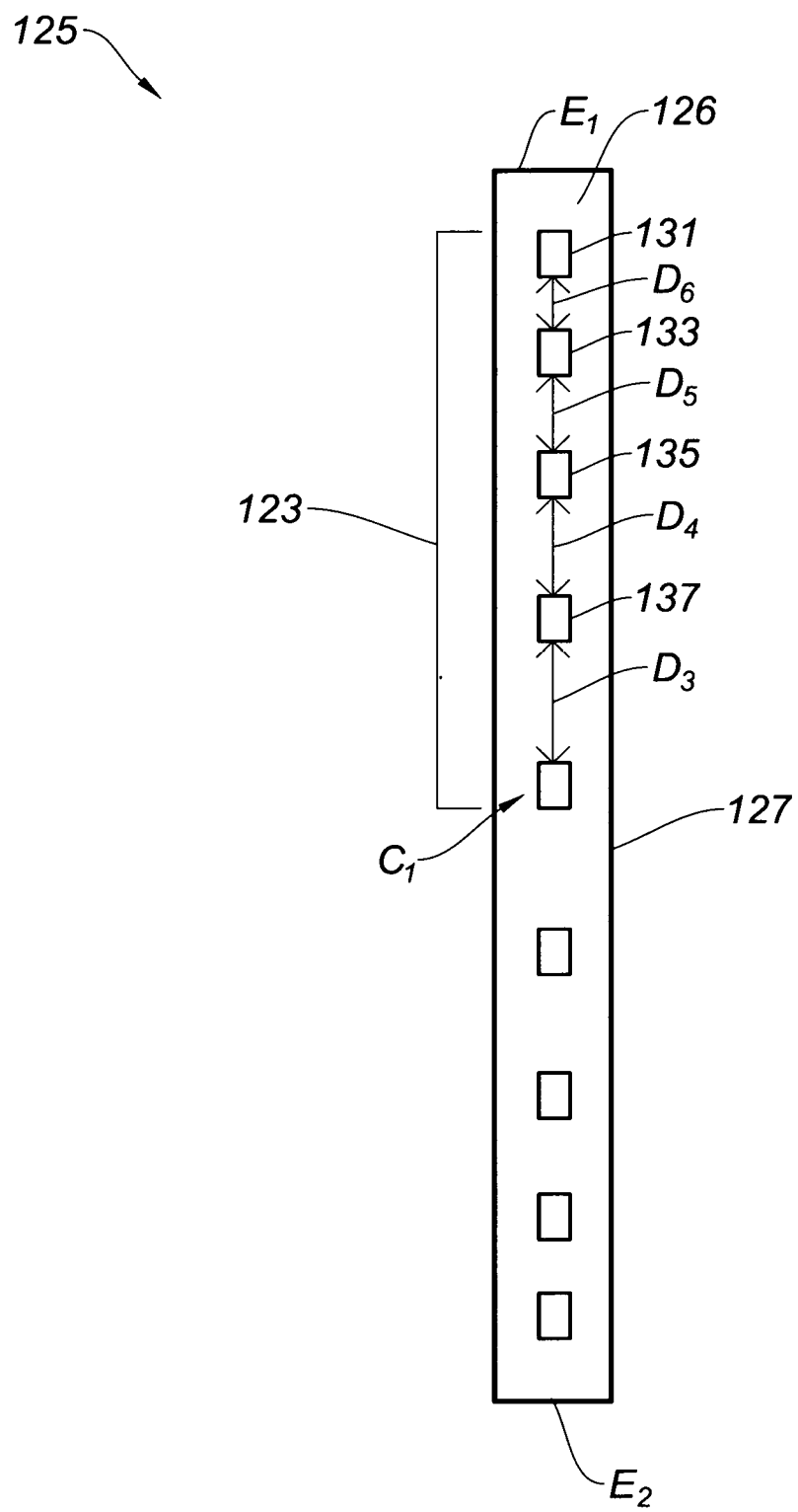
FIG. 1B illustrates a linear LED light bar with spatially modulated LEDs, or arrays of LEDs, located along a light emitting surface of the linear LED light bar, in accordance with the embodiments of the invention.

FIG. 1B illustrates a linear LED light bar 125 with spatially modulated LEDs, or arrays of LEDs, 131, 133, 135, and 137 that are located along a light emitting surface 126 of the linear LED light bar 127. The spatially modulated LEDs, or arrays of LEDs, 131, 133, 115 and 137 are arranged such that distances $D_3$, $D_4$, $D_5$ and $D_6$ between adjacent LEDs are sequentially reduced from the center of portions $C_1$ of the light emitting surface 126 to the two end portions $E_1$ and $E_2$ of the light emitting surfaces 126 or LED light bar. Using light bars with the spatially modulated LEDs, or arrays of LEDs, 131, 133, 115 and 137 to form a LED grow-light canopy increase light density and/or light intensity emitted around edges of the LED grow-light, while keeping the LED grow-light canopy footprint sized to match a grow bed of the same or similar size. In further embodiments, groups of LEDs or arrays of LED's 123 can be grouped to form LED arrays of various sizes.

Figure 1C:
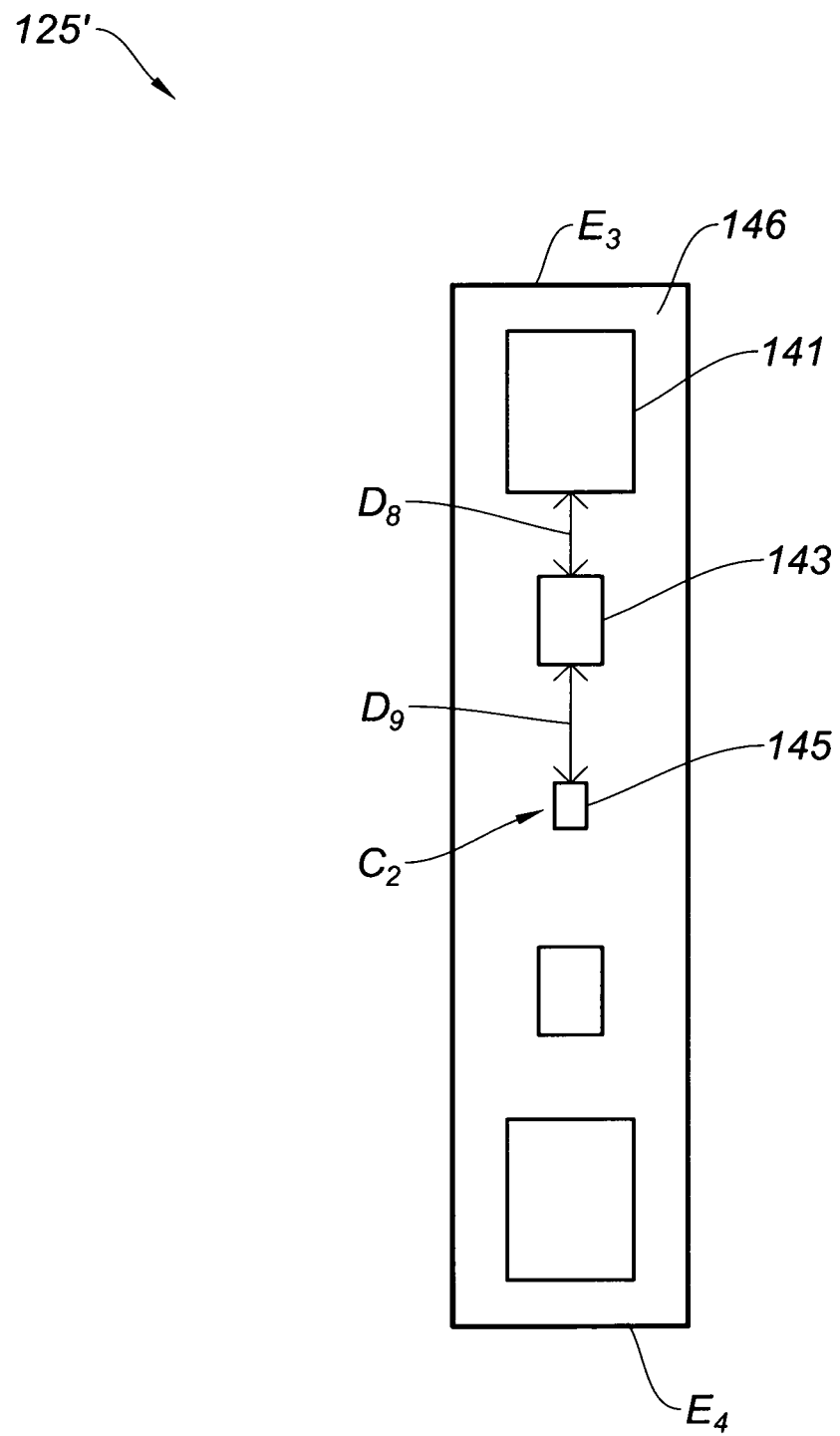
FIG. 1C. illustrates a linear LED light bar with physically modulated LEDs, or arrays of LEDs, located along a light emitting surface of the linear LED light bar, in accordance with the embodiments of the invention.

FIG. 1C. illustrates a linear LED light bar 125' with physically modulated LEDs, or arrays of LEDs, or grouping of LEDs 141, 143 and 145, located along a light emitting surface 146 of the linear LED light bar 125'. In accordance with this embodiment of the invention, the form factor or size of the LEDs, or arrays of LEDs, or grouping of LEDs, are larger near end regions $E_3$ and $E_4$ than the center region $C_2$. The LED groupings 141, 143 and 145 are arranged such that distances $D_8$ and $D_9$ between adjacent LEDs are sequentially reduced from the center portions $C_2$ of the light emitting surface 146 to the two end portions $E_3$ and $E_4$ of the light emitting surfaces 146 on the LED light bar 125'.

Figure 1D:
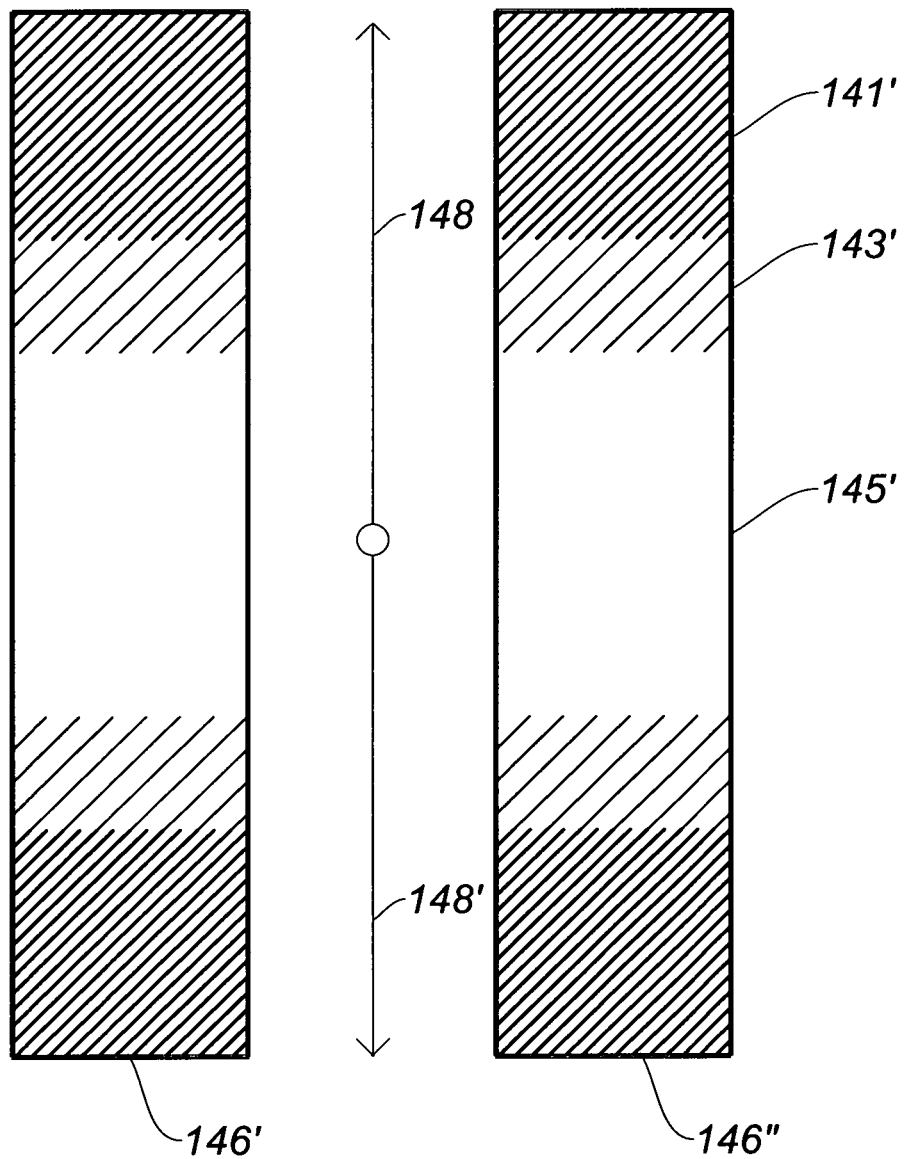
FIG. 1D shows a schematic representation of light density emitted from light emitting surfaces of modulated linear LED light bars

Referring now to FIG. 1D, wether LED light bars have spatially modulated LEDs, or arrays of LEDs, such as described with reference to FIG. 1B, or physically modulated or sized arrays of LEDs, such as described with respect to FIG. 1D, the LED light bars 146' and 146" used to form a grow-light canopy of the present invention preferably exhibit a gradient distribution of lighting, as indicated by the shading 141', 143', and 145', in the linear or elongated directions, indicated by the arrows 148 and 148'. The gradient distribution of light, as indicated by the shading 141', 143', and 145', exhibited by the LED light bars 146' and 146", in the directions 148 and 148', preferably corresponds to increase of light density or light intensity (luminous flux and luminous intensity) of 5%-25% or more as measured from the central portions of the linear LED light bars 146' and 146" to each end portion of the LED light bars 146' and 146".

Figure 1E:
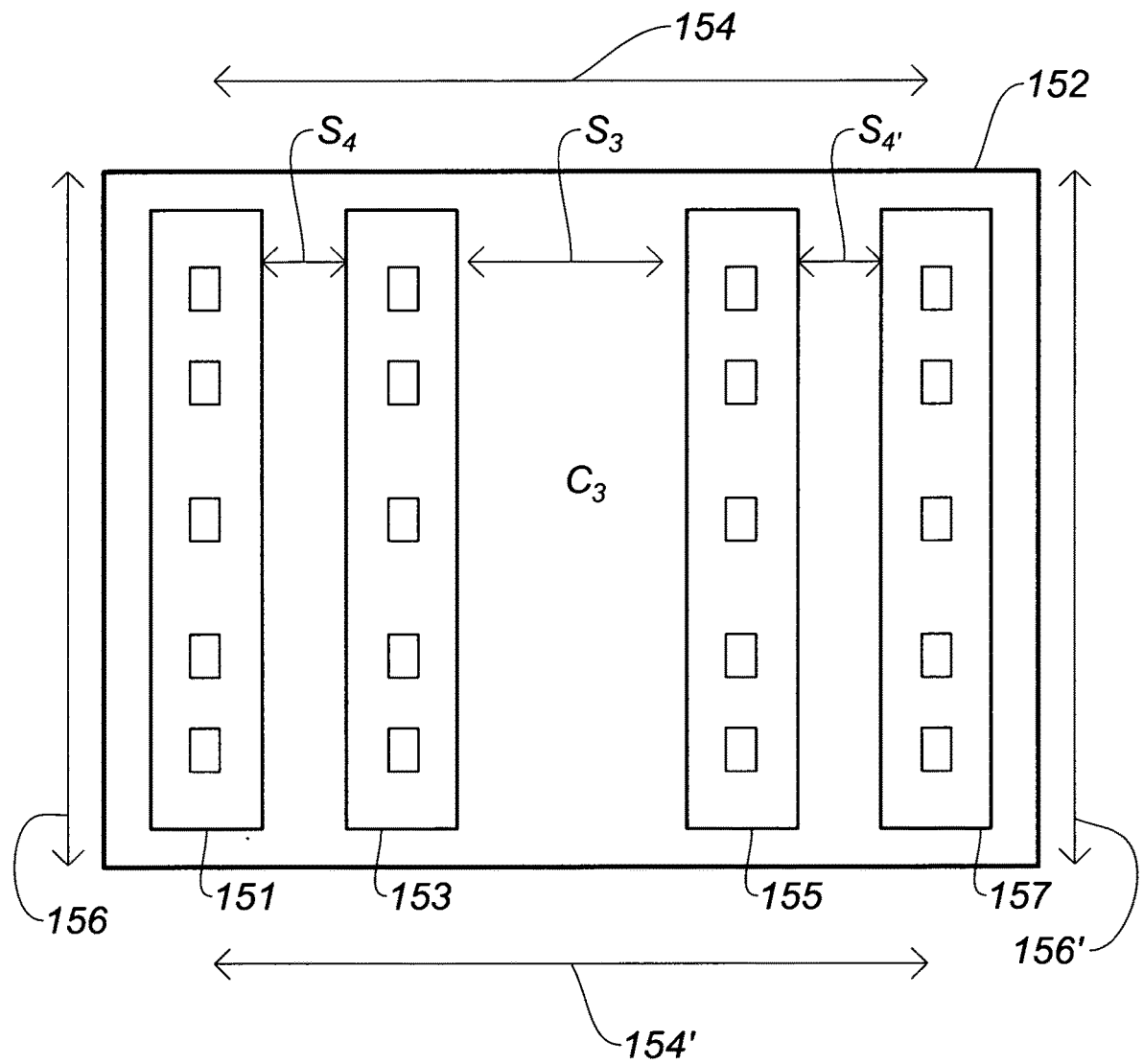
FIG. 1E shows a schematic representation of a grow-light canopy with linear LED light bars that are modulated through parallel separation, in accordance with the embodiments of the invention.

Referring to FIG. 1E, while modulated linear LED light bars 151, 153, 155 and 157, described above with respect to FIGS. 1B-C, reduces die-off of light density, or light intensity, at/or near end edges 154 and 154' of a grow box positioned under or below a LED grow-light canopy 152 formed from the modulated linear LED light bars, parallel edges 156 and 156' of the grow box can still experience die-off light density and/or light intensity. In order to address the die-off in light density or light intensity at/or near parallel or outer edges of the grow box, the parallel separation, or distances $S_4$, $S_3$, $S_4'$, between adjacent linear LED light bars are modulated such that the separation, or distances $S_4$, $S_3$, $S_4'$, decrease from a center portions $C_3$ of the LED grow-light canopy to outer side portions of parallel edges 156 and 156' of the LED grow-light canopy 152.

Figure 2A:
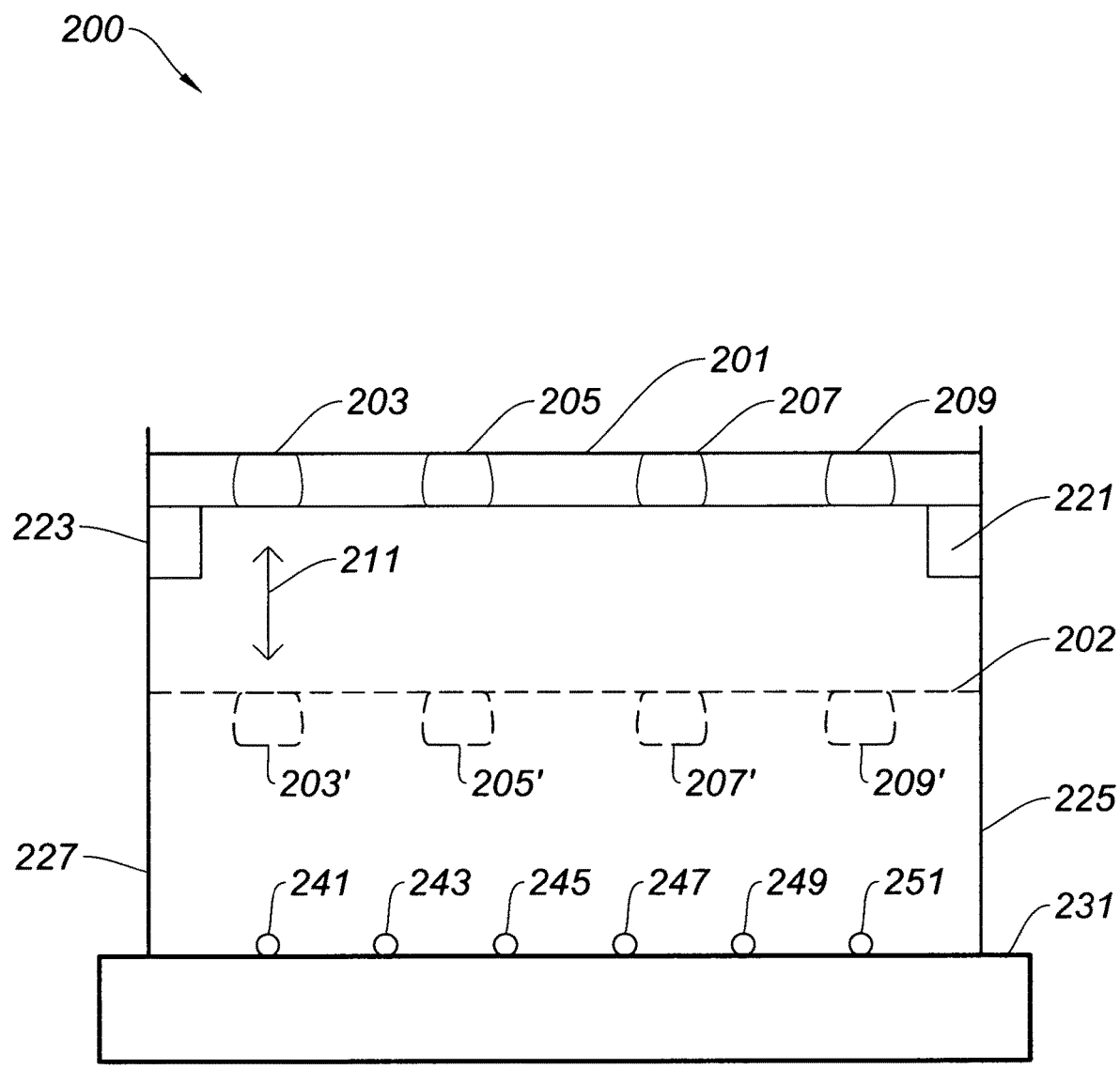
FIGS. 2A-B show schematic representations of LED grow-light systems with linear LED light bars that move up and down relative to a grow-light bed, in accordance with the embodiments of the invention.

FIG. 2A shows a schematic representation of a LED grow-light system 200. The LED grow-light system 200 includes a grow-light canopy 201. The grow-light canopy includes linear LED light bars 203, 205, 207 and 209. The LED light bars 203, 205, 207 and 209 can include modulated LEDs, or arrays or LED, and/or be spatially modulated with respect to each other laterality on the grow-light canopy 201, such as described above with reference to FIG. 1E.

Preferably, the grow-light canopy 201 and/or the LED light bars 203, 205, 207 and 209 move up and down, as indicated by the arrow 211. In a lowered position 202, the LED light bars 203', 205', 207' and 209' can emit greater intensity of light onto the grow bed 231. Preferably, the light canopy 201 and/or the LED light bars 203, 205, 207 and 209 move up and down by stepper motors 221 and 223 that are attached to the grow-light canopy 201 as well as attached to vertical pole structures 225 and 227 supporting the grow-light canopy 201 over the grow bed 231.

Still referring to FIG. 2A, the LED grow system 200 also includes sensors 241, 243, 245, 247, 249 and 251 for providing environmental data. The sensors 241, 243, 245, 247, 249 and 251 can include, but are not limited to, light sensor, moisture sensor and temperature sensor. The environmental data generated by the sensor can be used to determine a desired or preferred position of the light canopy 201 relative to the grow bed 231 and/or can be used to implement an automated grow-light protocols or programs suitable for the vegetation being cultivated.

Figure 2B:
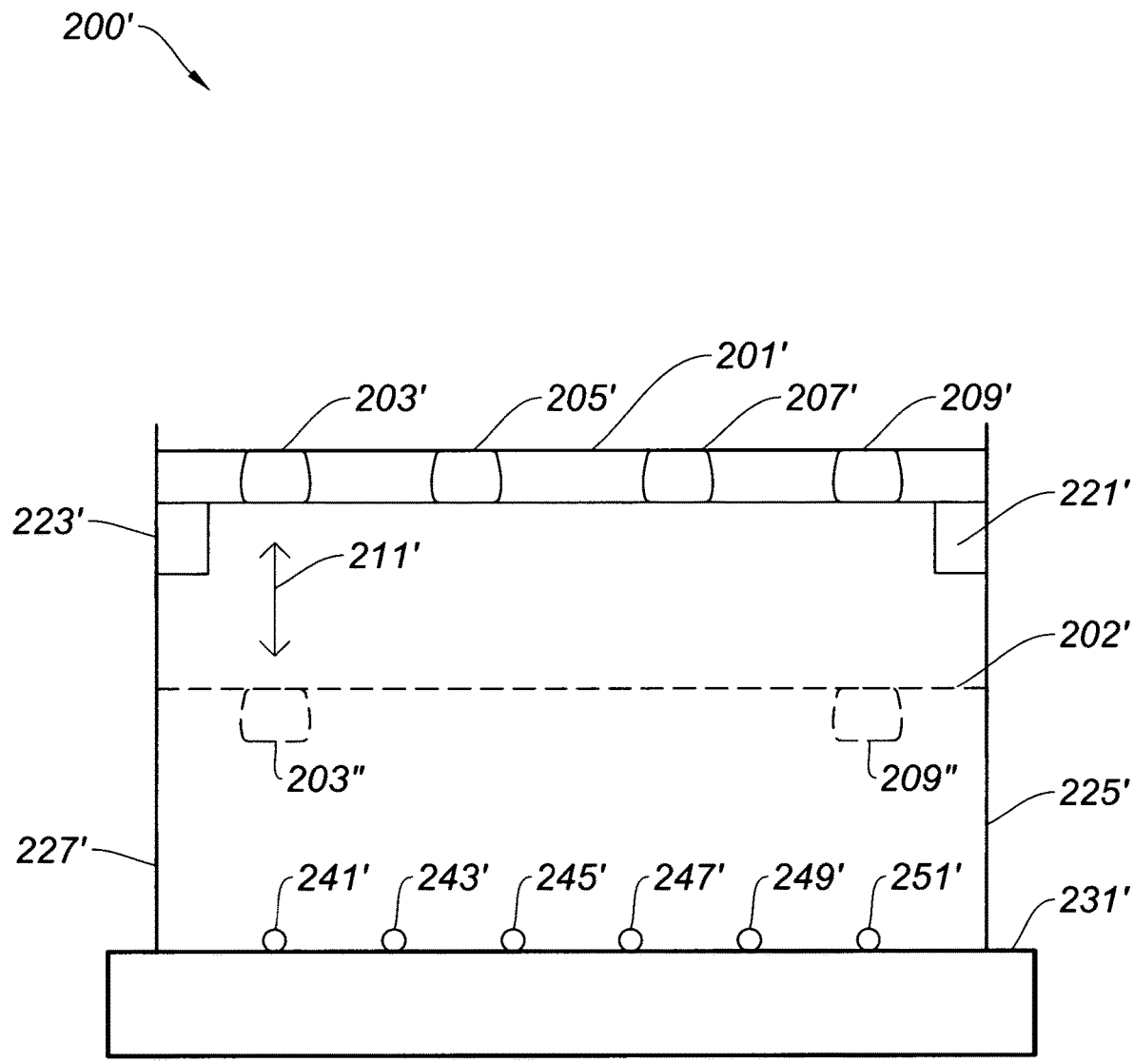

Referring to FIG. 2B, in an alternative embodiment of the invention, a LED grow-light system 200' includes a grow-light canopy 201' with LED light bars 203', 205', 207' and 209', wherein a portion of the LED light bars 203' and 209' move up and down, as indicated by the arrow 211' to the lowered position 202' with lowered LED light bars 203" and 209". In this way, the relative heights of LED light bars 203', 205', 207' and 209' can be modulated relative to the grow bed 231'. As mentioned previously, the LED grow system 200' can include any number of sensors 241', 243', 245', 247', 249' and 251', which are used to instruct and control positions of the LED light bars 203', 205', 207' and 209' relative to the grow bed 231', and used to implement an automated grow-light protocol or program suitable for the vegetation being cultivated.

Figure 3A:
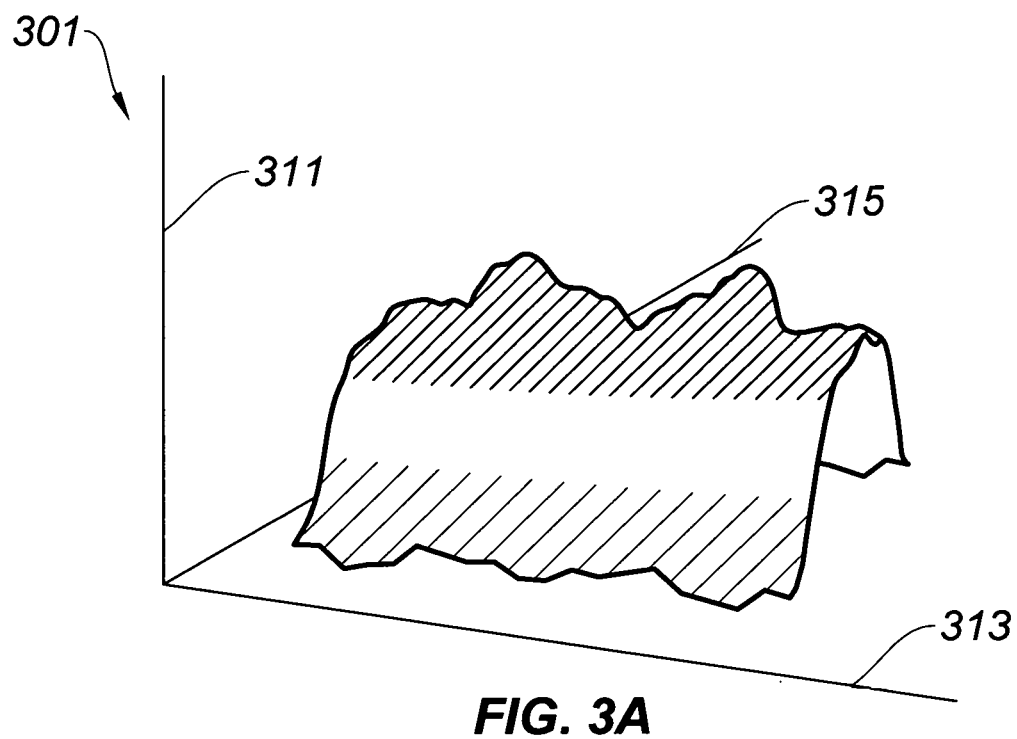
FIGS. 3A-B show graphical representations of evenly distributed light density over the grow-light bed afforded from an LED grow-light system of the present invention and prior art LED grow-light systems, respectively.

FIG. 3A shows a graphical representation 301 of an evenly distributed light density, or light intensity 311, over the area of a grow-light bed. The axis 315 corresponds to light density, or light intensity, at/or near end edges 154/154' (FIG. 1E) of a grow box 231/231' (similar to FIG. 2A-2B) positioned under, or below, a LED grow-light canopy 152 (FIG. 1E) formed from modulated linear LED light bars. Axis 313 corresponds to parallel edges 156/156' (FIG. 1E) of a grow box 231/231' (similar to FIG. 2A-2B) positioned under, or below, a LED grow-light canopy 152 (FIG. 1E) formed from modulated linear LED light bars.

Figure 3B:
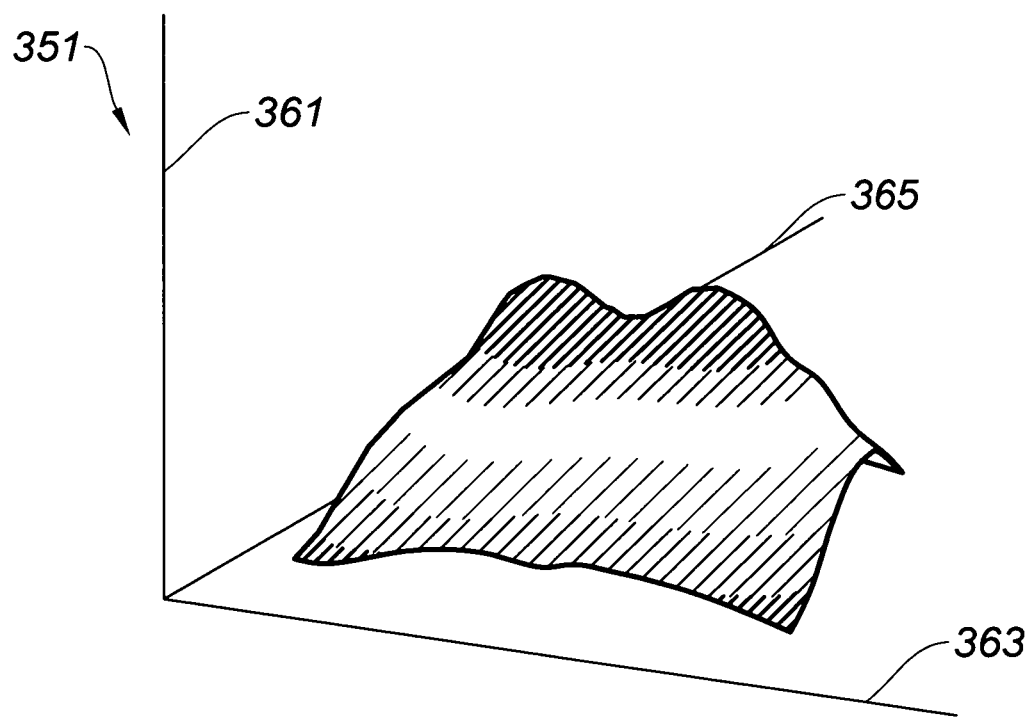

FIG. 3B shows a graphical representation 351 of an unevenly distributed light density and/or light intensity 361 over the area of a grow-light bed. The axis 365 corresponds to light density, or light intensity, at/or near end edges 154/154' (FIG. 1E) of a grow box 231/231' (similar to FIG. 2A-2B) positioned under, or below, a LED grow-light canopy 152 (FIG. 1E) formed from unmodulated linear LED light bars. Axis 363 corresponds to parallel edges 156/156' (FIG. 1E) of a grow box 231/231' (similar to FIG. 2A-2B) positioned under or below a LED grow-light canopy 152 (FIG. 1E) formed from unmodulated linear LED light bars.

Comparing FIG. 3A and FIG. 3B, the light density, and light intensity, near end edges 154/154' (FIG. 1E) of a grow box 231/231' (similar to FIG. 2A-2B) positioned under or below a LED grow-light canopy 152 (FIG. 1E) is more evenly distributed with modulated linear LED light bars than with unmodulated LED light bars.

Figure 4A:
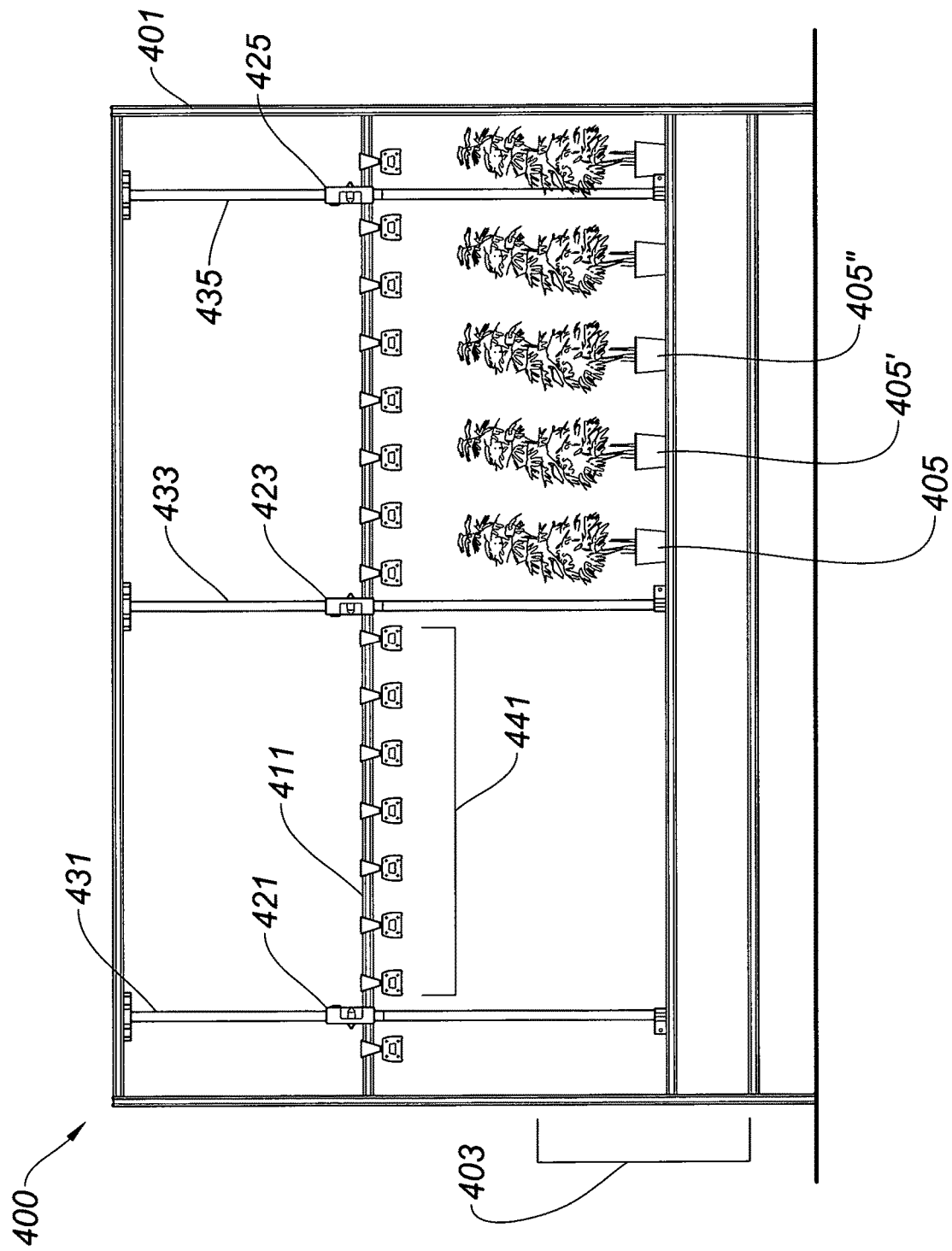
FIGS. 4A-B illustrate a LED grow-light system with a LED grow-light canopy that moves up and down relative to a grow bed using stepper motors, which are attached to the LED grow-light canopy, and move up and down along the canopy support pole structure, in accordance with the embodiments of the invention.
Figure 4B:
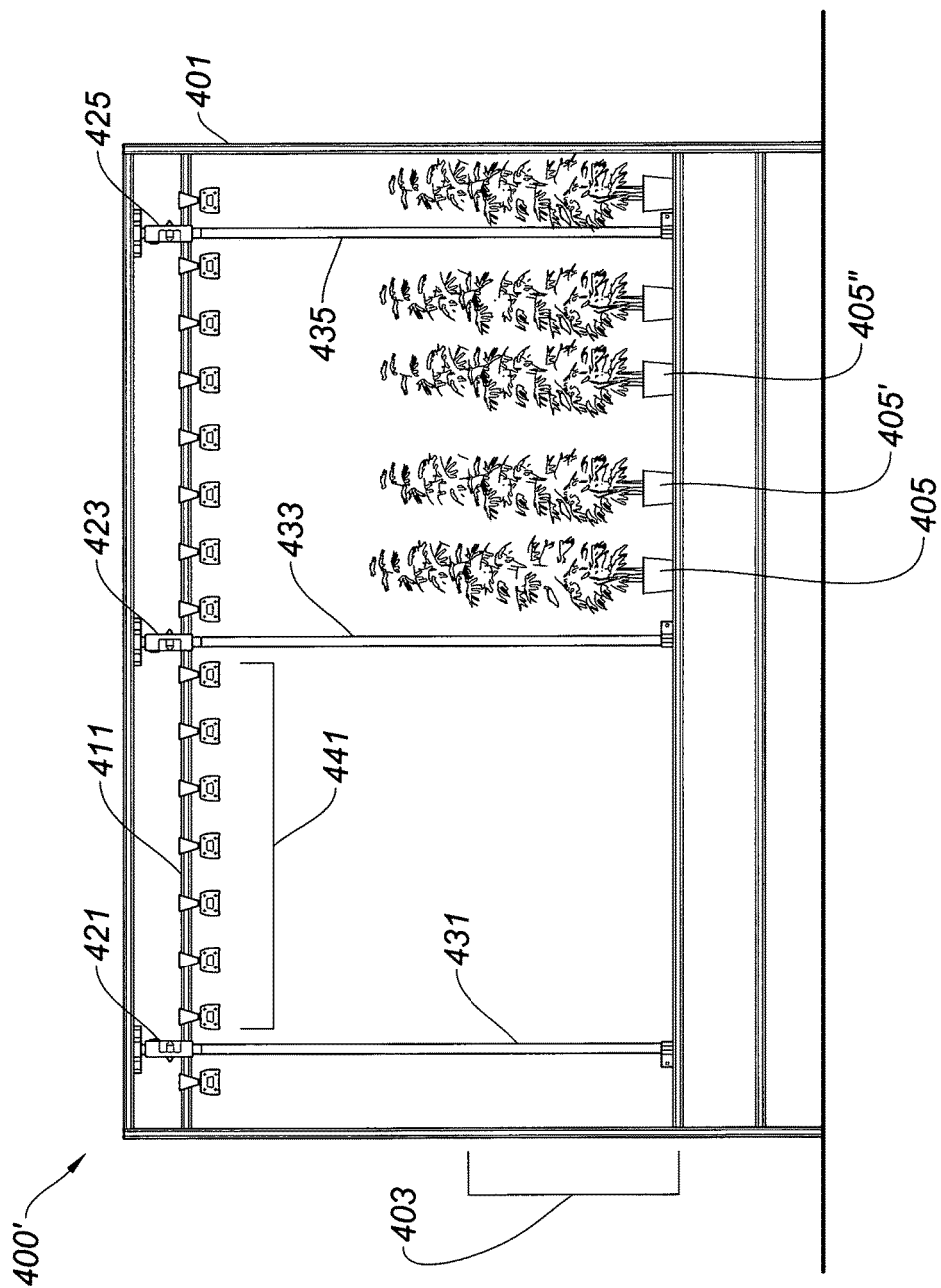

Referring to FIGS. 4A-B, a LED grow-light system 400/400' includes a grow-light canopy 411 with any number of LED light bars 441 that move up and down relative to a grow bed 403. The grow-light, system 400 has a support structure 401 that include vertical poles 431, 433, and 435. The grow-light canopy 411 preferably moves up and down relative to the grow bed 441 using stepper motors 421, 423 and 425, that are attached to the grow-light canopy 411, which moves up and down along vertical poles 431, 433, and 435. In accordance with the embodiments of the invention, the grow-light canopy 411 will automatically move vertically to accommodate the growth of vegetation 405, 405', and 405" being cultivated.

Figure 5A:
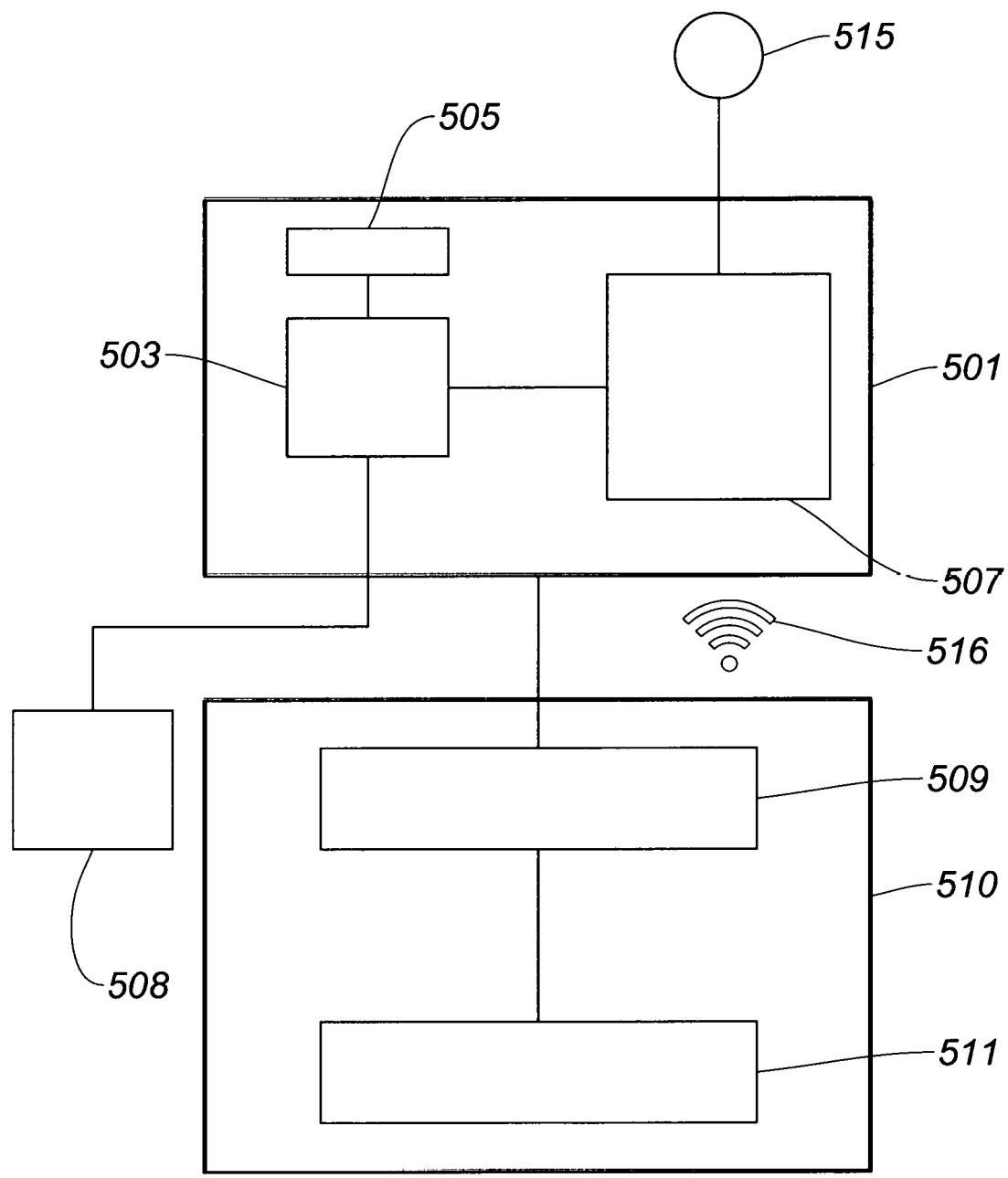
FIG. 5A shows a schematic representation of a control module for controlling positioning of a LED grow-light canopy relative to a grow bed, and to implement a grow-light protocol or program, in accordance with the embodiments of the invention.

FIG. 5A shows a schematic representation of control module 501, which controls the positioning of a LED grow-light canopy 510, with linear LED light bars 509 and 511, relative to a grow bed (not shown) and implementing grow-light protocols or programs. The control module 501 includes a micro-processor with memory 507 for storing data and running grow-light protocols or programs. The control module is coupled to sensor 515, to receive environmental data, and a radio receiver 508, to receive input instructions 516. In operation, an output interface 503 instructs stepper motors 505 to move the LED grow-light canopy 510 in accordance with grow-light protocols or programs, and input instructions 516 received by the radio receiver 508 and the environmental data provided by the sensors 515.

Figure 5B:
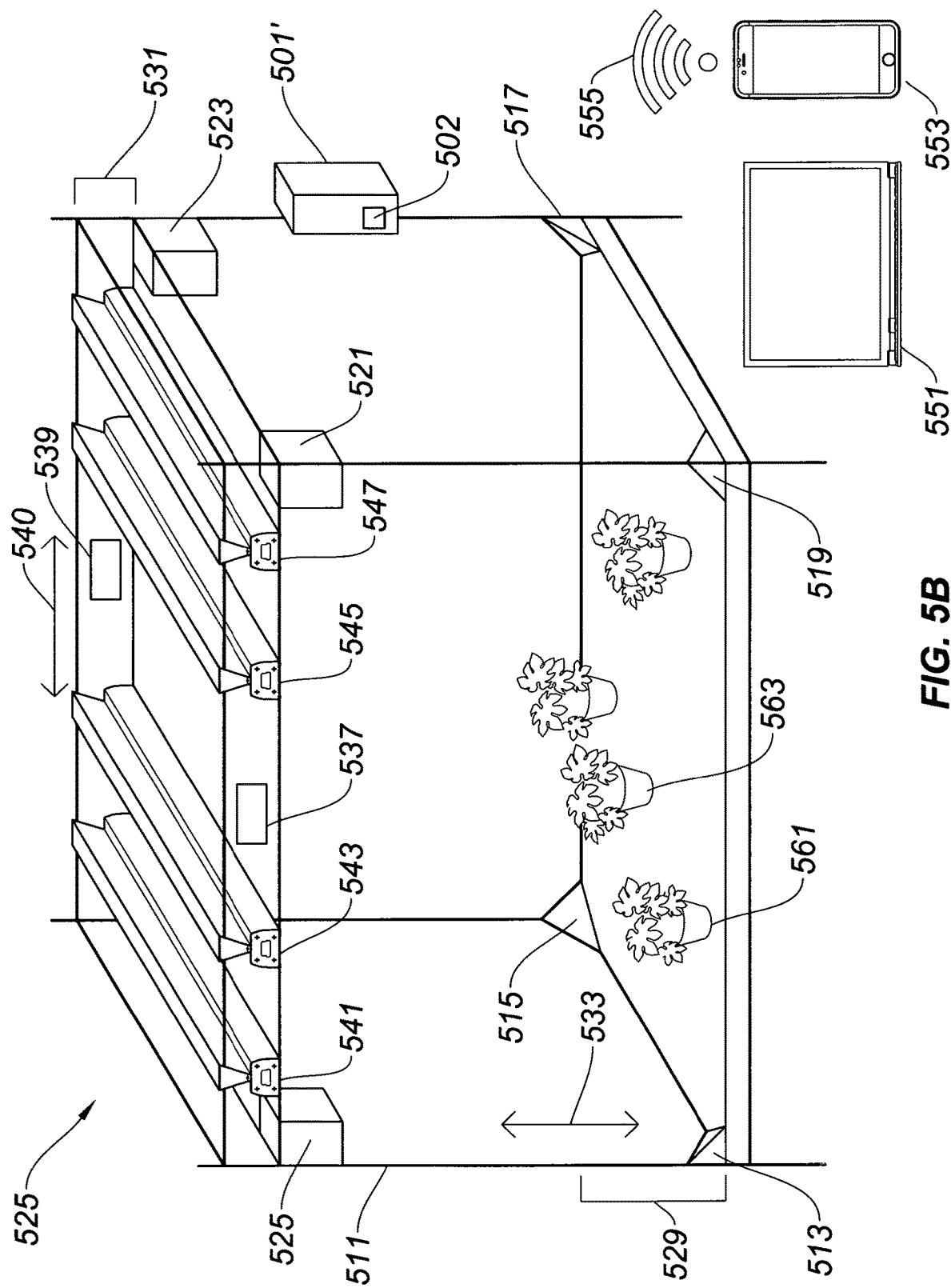
FIG. 5B illustrates a LED grow-light system with a control module, sensors, and a movable LED grow-light canopy, in accordance with the embodiments of the invention.

FIG. 5B is a schematic illustration of a LED grow-light system 525 in accordance with the embodiments of the invention. The LED grow-light system 525 includes a support structure 511 for supporting a grow-light canopy 531 over a grow bed 529 with plants 561 and 563 thereon. The grow-light canopy 531 includes linear LED light bars 541, 543, 545 and 547 that are configured to move up and down a portion of the support structure 511, as indicated by the arrow 533, via stepper motors 521, 523, 525 or any other suitable mechanism including, but not limited to, chain, pulley and wheel-type mechanisms. The LED grow-light system 525 can also include a number of environmental sensors 513, 515, 517 and 519 for detecting lighting conditions, temperature conditions and/or moisture conditions. The environmental sensors 513, 515, 517 and 519 are preferably in communication with a control module 501', directly or through a wireless network, to provide growing condition feedback used to modify the operational parameters of the LED grow-light system 525. The control module 501' includes all of the necessary components to control the position of the grow-light canopy 531 relative to the grow bed 529 and/or the plants 561/563 thereon, as well as operating the lighting (illumination times/intensities/colors) provided by the grow-light canopy 531. The control module can include an antenna structure 502 for receiving remote control commands 555 from a wireless remote control device 553, such as a cell phone, and/or receiving input data or command instructions over a network via a networked remote computer 551 to run grow-light protocols and programs, and execute the command instructions. In yet further embodiments of the invention, the LED grow-light system 525 grow-light canopy 531 also includes additional motors or mechanisms 537 and 539 for modulating the lateral spacing of adjacent LED light bars 541, 543, 545, and 547 in the directions indicated by the arrows 540 on the grow-light canopy 531.

Figure 6A:
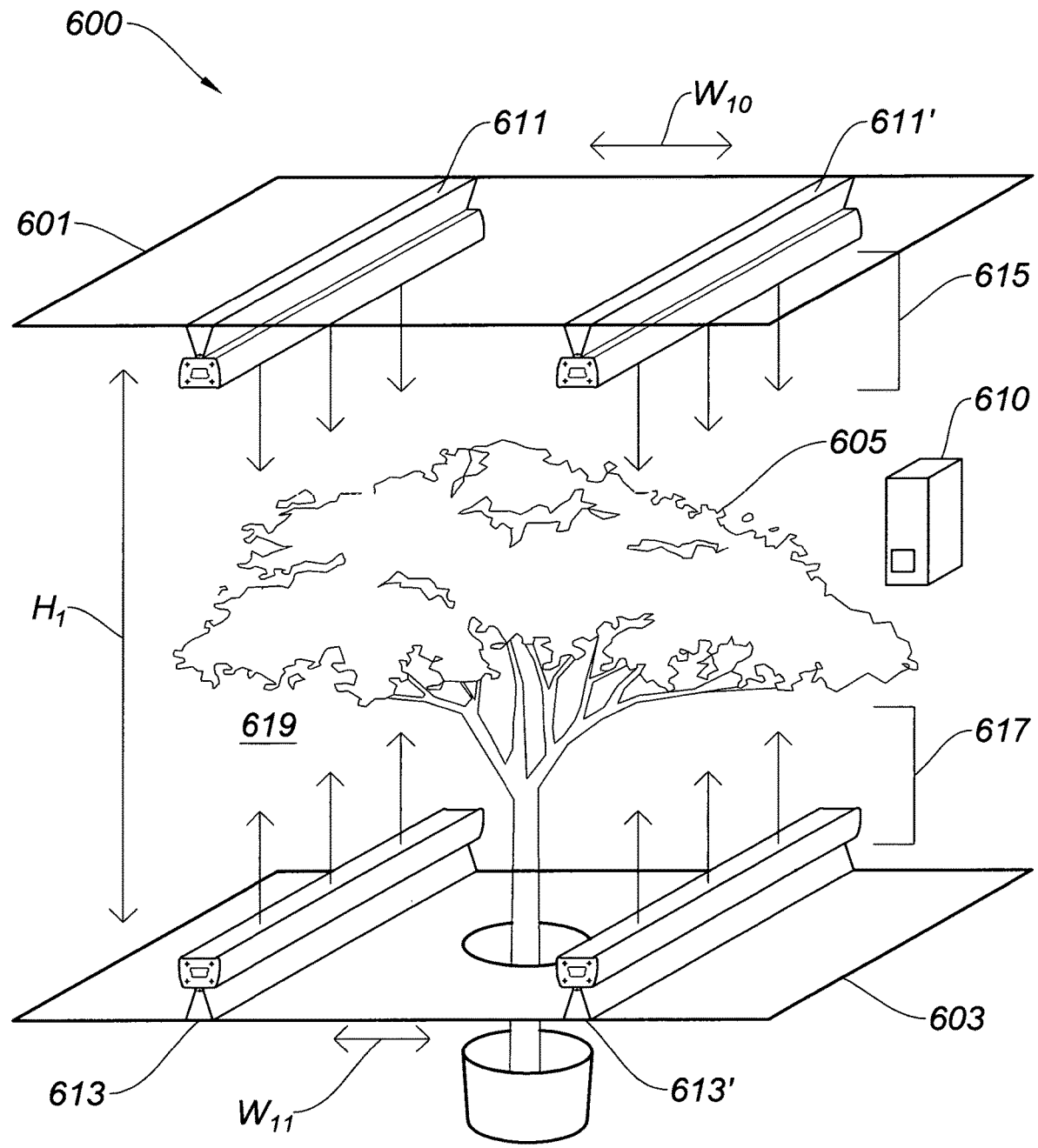
FIG. 6A shows a schematic representation of a dual-layer LED grow-light system with a control module to control the position of the canopies, and/or the LED light bars, relative to the grow bed, in accordance with the embodiments of the invention.

FIG. 6A illustrates a dual-layer LED grow-light, system 600 in accordance with the embodiments of this invention. The dual-layer grow-light system 600 includes a top light canopy 601 and a bottom light canopy 603. Each of the light canopies 601 and 603 include sets of light bars 611/611' and 613/613', respectively. Each of the light bars, 611/611' and 613/613', include LEDs, or combinations of LED arrays, to provide lighting with color temperatures and light intensities suitable for the application at hand. Lighting color temperatures and intensities emitted by the arrays of LEDs, or combinations of LED arrays, can be adjusted and controlled through a control module 610 (described in FIG. 5A-5B), which operates in response to sensor feedback and lighting protocols or programs running on a micro-processor.

In continued reference to FIG. 6A, the top light canopy 601 is preferably larger than the bottom light canopy 603 and a grow bed (not shown). The light bars 611/611' on the top light canopy 601 provide downward lighting, as indicated by the arrows 615, and the light bars 613/613' on the bottom light canopy 603 provide upward lighting, as indicated by the arrows 617. In operation, the dual-layer LED grow-light, system 600 combines downward lighting 615 above the foliage, and upward lighting 617, under the foliage, into a central illumination area 619 between the top light canopy 601 and the bottom light canopy 603.

In accordance with another embodiment of the invention, the distances $W_{10}$ and $W_{11}$ between the light bars 611/611' and 613/613' are adjustable, and the distance $H_1$ between the top light canopy 601 and bottom light canopy 603 are also adjustable. For example, the light canopies 601 and 603, and/or the light bars 611/611' and 613/613', are coupled to one or more stepper motors, or any other suitable mechanism, that is capable of adjusting $W_{10}$, $W_{11}$ and/or $H_1$ in accordance with the lighting needs of the vegetation 605 being cultivated. In addition, the positioning of $W_{10}$, $W_{11}$ and $H_1$ can be adjusted manually.

Figure 6B:
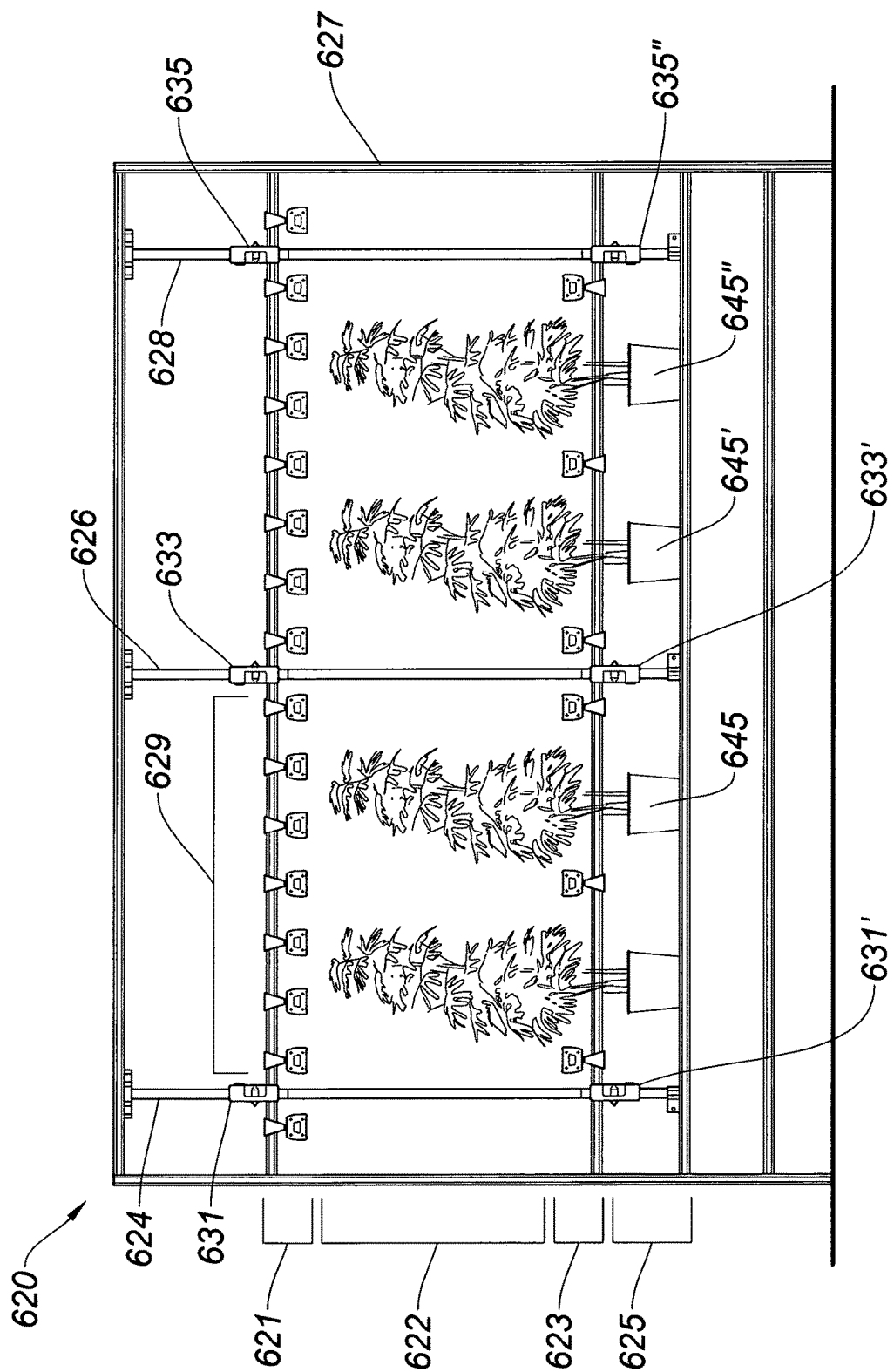
FIG. 6B illustrates a dual-layer LED grow-light, system with top and bottom LED grow-light canopies that are positioned relative to a grow bed using stepper motors, that are attached to the LED grow-light canopies, which move up and down along the canopy support pole structure, in accordance with the embodiments of the invention.

Referring to FIG. 6B, a LED grow-light system 620 includes a top light canopy 621 and bottom light canopy 623 with any number of LED light bars 629 that move up and down relative to grow bed 625. The grow-light system 620 has a canopy support structure 627 that includes vertical poles 624, 626, and 628. The top light canopy 621 and bottom light canopy 623 preferably moves up and down relative to the grow bed 625 using stepper motors 631/631', 633/633', and 635/635', which are attached to grow-light canopies 621 and 623 that move up and down along vertical poles 624, 626, and 628. In accordance with the embodiments of the invention, the grow-light canopy 621 and 623 can move, automatically or manually, to accommodate growth of vegetation 645/645'/645" being cultivated. Furthermore, grow bed 625 can also move up and down using stepper motors (similar to 631/631', 633/633', and 635/635 or any suitable mechanism) automatically, or manually, along vertical poles 624, 626, and 628 to accommodate growth of vegetation 645/645'/645" being cultivated within the central illumination area 622.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention. For example, the grow bed can also be configured to move up and down automatically. Moreover, multiple layers of grow-light canopies, with downward or upward illumination, and/or grow beds can be utilized when suitable for the application at hand.

What is claimed is:

1. A LED grow-light system comprising:
a) a top light canopy with top linear LED light bars for providing downward lighting into a open central illumination area, the top LED light bars being parallel with respect to each other; and
b) a bottom light canopy with bottom linear LED light bars for providing upward lighting into the open central illumination area, the bottom LED light bars being parallel with respect to each other, and wherein the top light canopy and bottom light canopy move up and down along vertical poles to change distances between the top light canopy and the bottom light canopy to thereby modulate the open central illumination area.

2. The LED grow-light system of claim 1, wherein LEDs within the top linear LED light bars or bottom LED light bars are spatially modulated.

3. The LED grow-light system of claim 1, wherein separations between a portion of the top linear LED light bars or bottom LED light bars are spatially modulated.

4. The LED grow-light system of claim 1, further comprising stepper motors for automatically moving the top light canopy or the bottom light canopy up and down along the vertical poles.

5. The LED grow-light system of claim 4, further comprising a control module for automatically controlling the stepper motors in response to control commands.

6. The LED grow-light system of claim 5, further comprising sensors for providing environmental data to the control module, wherein the environmental data is used to generate the control commands.

7. A LED grow-light system comprising:
a) a top light canopy with top linear and parallel LED light bars for providing downward lighting into a open central illumination area; and
b) a bottom light canopy with bottom linear and parallel LED light bars for providing upward lighting into the open central illumination area, wherein the top light canopy and bottom light canopy move up and down relative to the grow bed using stepper motors mounted to vertical support poles and are coupled to the top light canopy and the bottom light canopy and wherein separations between a portion of the top and parallel linear LED light bars and bottom linear and parallel LED light bars are adjustable.

8. The LED grow-light system of claim 7, wherein LEDs within the top linear and parallel LED light bars or bottom linear and parallel LED light bars are spatially modulated to provide greater light output near ends of the top linear and parallel LED light bars or bottom linear and parallel LED light bars.

9. The LED grow-light system of claim 7, further comprising a control module for automatically controlling the stepper motors in response to control commands.

10. The LED grow-light system of claim 9, further comprising sensors for providing environmental data to the control module, wherein the environmental data is used to generate the control commands.

11. A LED grow-light system comprising:
a) a top light canopy with top linear LED light bars for providing downward lighting into an open central illumination area;
b) a bottom light canopy with bottom linear LED light bars that are substantially parallel with the top linear LED light bars for providing upward lighting into the open central illumination area, and wherein the top light canopy and bottom light canopy move up and down relative to the grow bed using stepper motors mounted to vertical support poles and are coupled to the top light canopy and the bottom light canopy.

12. The LED grow-light system of claim 11, further comprising a control module for receiving the control commands.

13. The LED grow-light system of claim 12, wherein the control module includes a micro-processor for executing a grow-light protocol or program and controlling light emitted from the top light canopy and the bottom light canopy in accordance with the grow-light protocol or program.

14. The LED grow-light system of claim 11, wherein LEDs within the top linear LED light bars or bottom LED light bars are spatially modulated.

15. The LED grow-light system of claim 11, wherein separations between a portion of the top linear LED lights bars or bottom LED light bars are spatially modulated.

16. The LED grow-light system of claim 11, wherein the stepper motors automatically moving the top light canopy or the bottom light canopy up and down along the vertical support poles in response to control commands.

17. The LED grow-light system of claim 16, further comprising sensors for providing environmental data to the control module, wherein the environmental data is used to generate the control commands.

* * * * *